Nov. 28, 1933.     O. HUTCHINS     1,937,060

SILICON CARBIDE AND THE MANUFACTURE THEREOF

Filed Nov. 17, 1931

INVENTOR
OTIS HUTCHINS.
BY
ATTORNEY

Patented Nov. 28, 1933

1,937,060

UNITED STATES PATENT OFFICE 1,937,060

SILICON CARBIDE AND THE MANUFACTURE THEREOF

Otis Hutchins, Niagara Falls, N. Y., assignor to The Carborundum Company, Niagara Falls, N. Y., a corporation of Pennsylvania Application November 17, 1931
Serial No. 575,631

7 Claims. (Cl. 204—62)

This invention relates to a method of manufacturing silicon carbide, and to an improved product resulting therefrom. It relates particularly to a variety of silicon carbide which in lump form possesses a unique structure, and which is formed in the furnace in densely compacted masses having unusual physical properties.

Silicon carbide, as it is usually produced, consists of a porous mass of more or less perfectly developed crystals. These crystals are evidently built up by deposition from vapor, and tend to assume their characteristic geometric shape and present well-developed crystal faces. The crystals are often only loosely coherent and can be readily crushed either into individual crystals or crystal fragments and even when crushed into abrasive grain, a considerable portion of the surface presented is that of the original crystal faces. The character of the material is thus entirely different from the densely compacted "pig" resulting from the solidification of a fused material.

Silicon carbide as made by my process consists of densely compacted masses which possess a structure very similar to that of a material solidified from a molten state. My material is usually dark green in color and possesses a glassy or irregular fracture, which on casual inspection appears to be almost metallic. I have found, however, that the material is in no way metallized, and it is not to be confused with the so-called "siliconized" silicon carbide. Chemical analysis shows that the silicon content is practically identical with that of the ordinary variety of silicon carbide, and corresponds to the theoretical proportions for the compound SiC. The metallic appearance which my material frequently possesses obtains only with reflected light, and the examination of thinner sections (for example, about one sixteenth of an inch in thickness) reveals that a substantial proportion of the material is usually either translucent or transparent.

The structure of typical specimens of my material, as revealed by polished surfaces and thin sections, is shown in the accompanying drawing.

Figure 1:
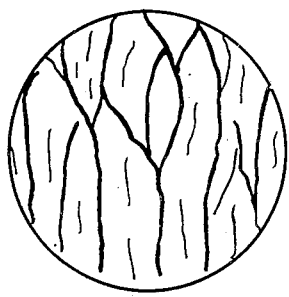
Figure 1 shows the microstructure of a typical section of my material as it comes from the silicon carbide furnace, the section being a polished surface in a plane at right angles to the axis of the furnace.

On examination of polished sections of my material, one of the outstanding characteristics is the fact that the crystalline units making up the mass are bounded into irregular shaped areas or "grains", very similar to the grains of a cast metal. With most specimens, these areas are comparatively large, and can be readily observed with the unaided eye. They are usually elongated in a direction which is radial with respect to the furnace in which the material is made, as shown in Figure 1. The boundaries of these large crystal units are in general devoid of any regular or crystalline shape, and I will refer to them as allotriomorphic crystals, since they correspond in form and appearance to the allotriomorphic crystals commonly obtained during the solidification of a fused material.

The term "allotriomorphic" is applied to crystals solidifying from a molten material, in which the formation of perfect crystal faces is interfered with to such an extent by neighboring crystals that the mass crystallizes out as irregularly shaped grains. By referring to the larger crystal units of my material as allotriomorphic, I refer merely to external form and structure without necessarily implying that the mass has been fused.

Figure 2:
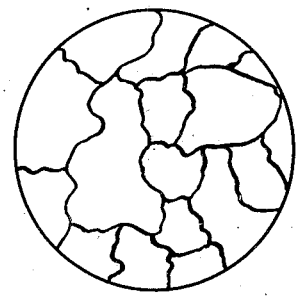
Figure 2 shows the microstructure of a polished surface at right angles to that shown in Figure 1.

In the formation of my material, these irregularly shaped grains grow together to form a practically continuous solid. A transverse section of the material, as shown in Figure 2, presents areas in which the grains are not elongated, as is the case with the longitudinal section, but in which the crystal units are irregular in shape and in which there is practically no discontinuity in the solid nature of the material at the crystal boundaries. The "grains" or crystal units can be distinguished from each other only by their differences in orientation, transparency and polishing characteristics.

Figure 3:
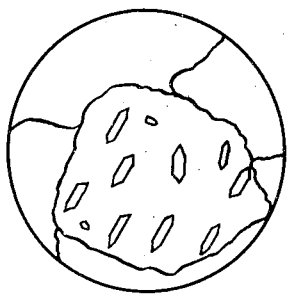
Figure 3 shows the microstructure of a polished portion which is transparent, so that the material can be observed for an appreciable depth below its surface.

My material is often sufficiently transparent so that its inner structure can be examined microscopically by subjecting a polished surface to oblique illumination. Under these conditions the light penetrates to a slight depth below the surface of the material. With this form of examination, it is found that the larger crystal units or grains form a transparent matrix of glassy appearance, in which are embedded other small silicon carbide crystals. These crystals may be almost microscopic in size, and many of them are perfectly formed hexagonal plates. The boundary between the embedded crystalline material and the surrounding matrix is sharply defined, and the embedded crystals often possess a different orientation from the surrounding matrix. The appearance of such a specimen is shown in Figure 3. I am not able to account for the crystallization of these smaller crystals within the larger grains, but their presence has been determined by microscopic observation. I will refer to the small crystals scattered through the glassy matrix as idiomorphic crystals, since they were apparently formed under conditions where their growth was not restrained with respect to the development of external form.

Figure 4:
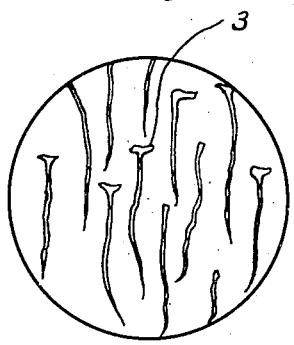
Figure 4 shows the microstructure of a typical thin section parallel to the surface shown in Figure 1.

A thin section of my material, taken longitudinally with respect to the elongated grains, often reveals parallel fibrous inclusions within the transparent matrix making up the grain. This structure is shown in Figure 4, the fibres being designated by 2. These fibres may be either silicon carbide crystallized within the matrix, or voids. A plate-like crystal, designated by 3, is often found at the end of the fibre.

Figure 5:
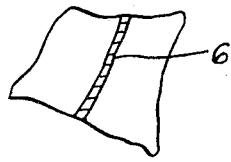
Figure 5 shows a thin section of one of the individual granules in a finished article made from my material.

One feature which imparts unique properties to my material, especially when crushed into grain, is its unusual fracture in comparison with the ordinary variety of silicon carbide. Instead of readily separating into individual crystals or crystal fragments, my material fractures irregularly, so as to present a grain the surface of which does not coincide with the original crystal faces of the material as it is made in the furnace. The grain is therefore comparatively free from the usual surface impurities and can be bonded into a finished article such as an abrasive wheel without any necessity of chemical treatment. The impurities which may occur in the lump material are located principally at the boundaries between the larger crystal units, and the material tends to fracture through the crystal itself rather than along these intercrystalline boundaries. A fracture of this type is frequent with materials solidified from a molten mass, but is not characteristic of the ordinary variety of silicon carbide. In my crushed material these original boundaries are often buried within the individual particles, and the surface analysis of my untreated material compares favorably with the usual abrasive grain after it is chemically treated to remove surface impurities. In Figure 5, the particle shown is composed of parts of two separate crystals and the boundary 6 runs directly through the particle. This drawing was made from a thin section of a finished article.

The usual silicon carbide crystal is built up of a series of thin plates or laminations, whereas my material is characterized by an almost complete lack of any laminated structure. The laminated structure of the usual silicon carbide crystal can be detected even when the crystal is very transparent or when it is reduced to a comparatively thin section, but with my material the larger grains or crystal units appear homogeneous except for the separately crystallized silicon carbide included therein. My material somewhat resembles fused alumina in its structure.

The lack of a laminated structure and of exposed crystal forces in the crushed grain imparts very desirable electrical properties to my material. The electrical properties of a laminated silicon carbide crystal are highly directional, and the electrical properties of the crystal faces are also very erratic, so that the usual crushed grain is unsatisfactory for many electrical purposes, and especially for the manufacture of recrystallized silicon carbide heating elements. My material is characterized by a comparatively uniform electrical resistance, which is considerably less than that of the laminated or highly crystalline material. A recrystallized silicon carbide resistor made from the type of grain which I describe is claimed in a copending application of Ernest Hediger, filed of even date herewith.

The rough or irregular surface of my material makes it very adaptable for use as a polishing grain without any special treatment. It is customary to treat the usual abrasive grain by special processes to give it a surface of a character presented by my material on crushing.

In making my material, I employ any type of furnace which can be used for the commercial production of silicon carbide. The usual silicon carbide furnace and the process as carried out commercially are both well-known and will be described only briefly. The furnace consists of a long trough or casing of refractory material in which is placed a mixture of sand and carbon, which mixture may also contain sawdust and salt as minor ingredients. The mix is heated by a centrally conducting carbon core, and the silicon carbide crystals form around the core in porous crystalline masses which can be broken readily in lumps consisting of crystal aggregates. In the process as carried out commercially, the dissipation of heat from the core is regulated so that a minimum amount of the silicon carbide formed is decomposed. With the usual furnace the core is proportioned so that it radiates energy at approximately 4.4 kilowatts per square foot of core area, since with a 36 hour run this energy dissipation decomposes very little of the silicon carbide produced. The typical mix contains sand and coke in about the proportion of 60 per cent sand to 40 per cent coke.

I have found that, by modifying the above procedure, an entirely different product, having a structure substantially that herein described, can be produced. In making my material I increase the temperature of the core so that a substantially greater amount of silicon carbide is decomposed immediately adjacent the core than is the case with the production of the ordinary variety of silicon carbide crystals. I have found that satisfactory results can be obtained by increasing the radiation per square foot of core area by approximately 30 per cent over that customary in the production of the highly crystalline variety of grain; for example, if the furnace design is such that highly crystalline silicon carbide is produced with very little decomposition when the core radiates 4.4 kilowatts per square foot, I increase this value to approximately 5.7 kilowatts per square foot. The exact power value used will, of course, depend somewhat on the design of the furnace.

In addition to the increase in core temperature, the coke content of the furnace mix should also be increased as, for example, from an original value of 40 per cent to a value of 43 per cent. With a mix of this character, combined with an increased core temperature, the produce produced near the core consists of massive lumps of the densely compacted material instead of aggregates of well-developed crystals.

As a means of increasing the radiation from the core of the silicon carbide furnace, I prefer to use a core of diminished cross-section and to operate the furnace at approximately its normal power input. If the usual core is employed, it is necessary to operate the furnace at approximately a 30 per cent overload.

Owing to the decomposition of the silicon carbide formed immediately adjacent the core, a certain amount of silicon vapor is produced. This vapor percolates through the sand-carbon mix and combines with the small excess of carbon at the same time that the silicon carbide is produced by the reaction between the carbon and silica. Even though the excess of carbon may be comparatively small, I have found that this simultaneous reaction, combined with a high temperature, entirely alters the crystalline character of the product.

A chemical analysis of my material shows that it is substantially free from an excess of silicon or carbon. The material is also of higher chemical purity than the highly crystalline silicon carbide made from the same materials. I do not know the exact reason for this higher purity, but believe that, owing to the higher temperature, a greater portion of the impurities may be volatilized and condensed in the outer portions of the furnace.

The apparent density of my material in lump form may vary from about 2.4 to 2.8 but is usually 2.6 or greater. The apparent density of the ordinary variety of silicon carbide in lump form as it comes from the furnace is usually less than 1.8 and often is less than 1.0. The apparent density of a body is defined as the weight in grams of one cubic centimeter of the material, when the volume includes both the solid matter and the pore space. In measuring the apparent density of a lump of silicon carbide, a lump having a minimum dimension of about two inches should be weighed in air, and the pores impregnated with paraffin by boiling in the latter and allowing the paraffin to solidify without removing the piece. The original shape is then restored as nearly as possible by cutting or scraping off the excess paraffin and then gently applying a Bunsen burner to the outer portions of the piece until the original shape is restored. The impregnated lump is weighed in air and the volume determined by loss in weight on immersion in water.

Another distinguishing property of my material is its electrical resistance. Since my material is comparatively free from excess silicon or carbon, it has an electrical resistance much higher than any form of siliconized silicon carbide. The specific resistance of the 60 mesh material is of the order of magnitude of from one to ten million ohms per centimeter cube when measured under conditions which will be described. The usual crystalline grain has a specific resistance of from two to five times this value.

Electrical resistance measurements on crushed grain cannot be duplicated unless a definite set of conditions obtain with each measurement, so that I have standardized on a value measured in a "Pyrex" glass tube 2.5 centimeters in diameter and 3.5 centimeters long, with an applied voltage of 14 volts per centimeter and under a pressure of 15 kilograms per centimeter square. The degree of packing makes considerable difference in the result, and in my measurements the tube used as a container is filled without shaking or jolting and the pressure applied by a plunger attached to a lever arm weighted 24 inches from the plunger. The lever is on a rack and pinion at its weighted end, so that it can be lowered gradually until the pressure is applied to the grain. Chromium plated plungers are used for electrical contact. I will designate the electrical resistance of the grain when crushed to 60 grit and measured under the above conditions as the "resistance value" of the material. By "60 grit" I refer to the specifications of the Technical Committee of the Producers of Electrical Furnace Abrasives, prepared in collaboration with the Bureau of Standards.

My material, when crushed, usually shows a substantial proportion of transparent or translucent greenish particles in which the separate crystal units embedded within the transparent matrix can often be detected microscopically, especially in thin sections.

Having thus described my invention, I claim:

1. Silicon carbide composed of allotriomorphic crystal units joined to form a massive substantially continuous solid.

2. Silicon carbide composed of allotriomorphic crystal units having small idiomorphic crystals of silicon carbide embedded therein.

3. Silicon carbide composed of allotriomorphic crystal units joined to form a massive substantially continuous solid, and small idiomorphic crystals of silicon carbide embedded within the said units.

4. Silicon carbide grain of the character obtained by crushing lump silicon carbide of a variety composed of allotriomorphic crystal units joined to form a massive substantially continuous solid, a substantial proportion of the boundaries between the said crystal units being contained within the body of the individual grains.

5. Silicon carbide grain composed of crushed particles of a substantially continuous matrix of silicon carbide having separate crystal units of silicon carbide embedded therein.

6. Silicon carbide grain composed of crushed particles of a substantially solid matrix of silicon carbide and having silicon carbide crystals of different orientation from the matrix embedded within the matrix.

7. Silicon carbide grain composed of a substantial proportion of transparent particles, the said particles consisting of a matrix of silicon carbide and other separately crystallized particles of silicon carbide embedded within the matrix.

OTIS HUTCHINS.